C. H. FULSON.
DEVICE FOR COOKING COTTON SEED OR LINSEED MEATS.
APPLICATION FILED NOV. 22, 1911.
1,041,455.
Patented Oct. 15, 1912.
2 SHEETS—SHEET 1.
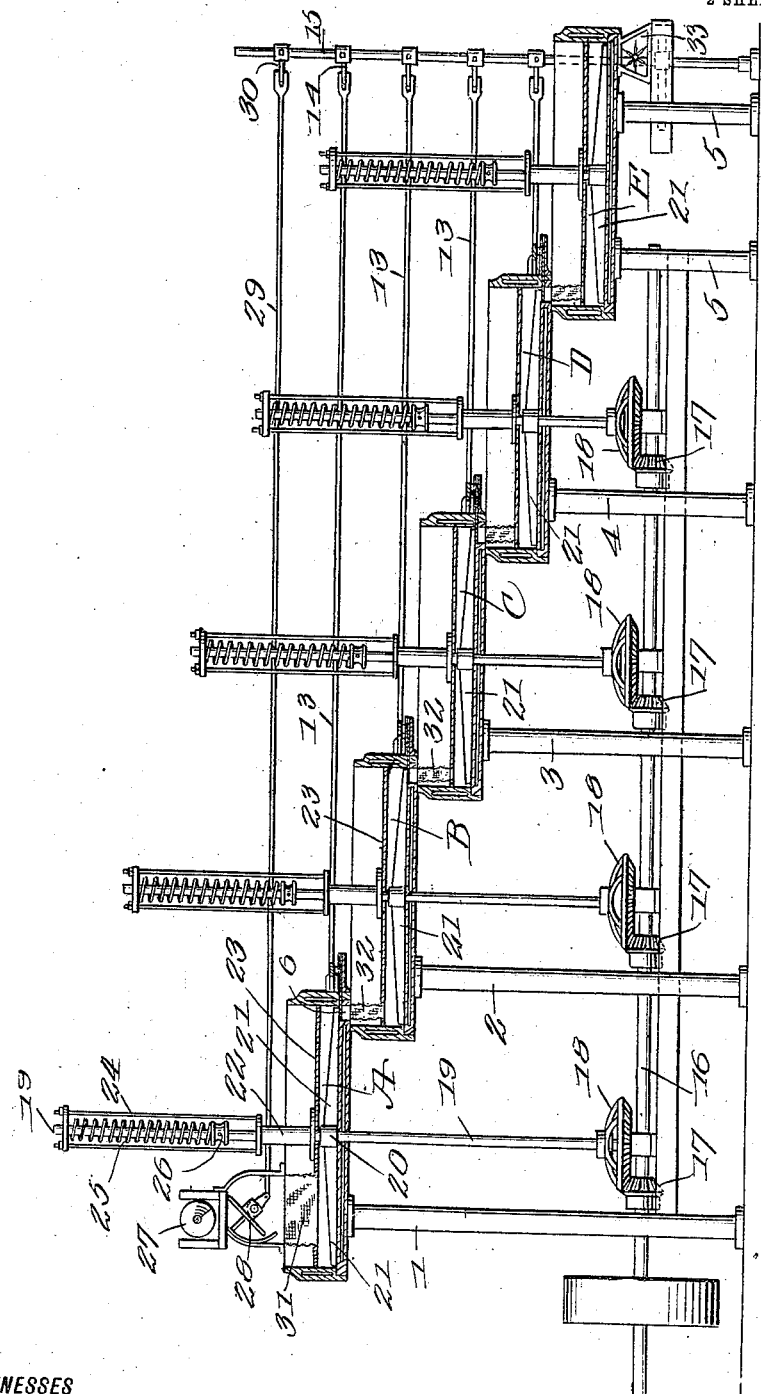
WITNESSES
Samuel E. Wade.
R. A. Stanley
INVENTOR
CHARLES H. FULSON
BY Munn & Co.
ATTORNEYS C. H. FULSON.
DEVICE FOR COOKING COTTON SEED OR LINSEED MEATS.
APPLICATION FILED NOV. 22, 1911.
1,041,455.
Patented Oct. 15, 1912.
2 SHEETS—SHEET 2.
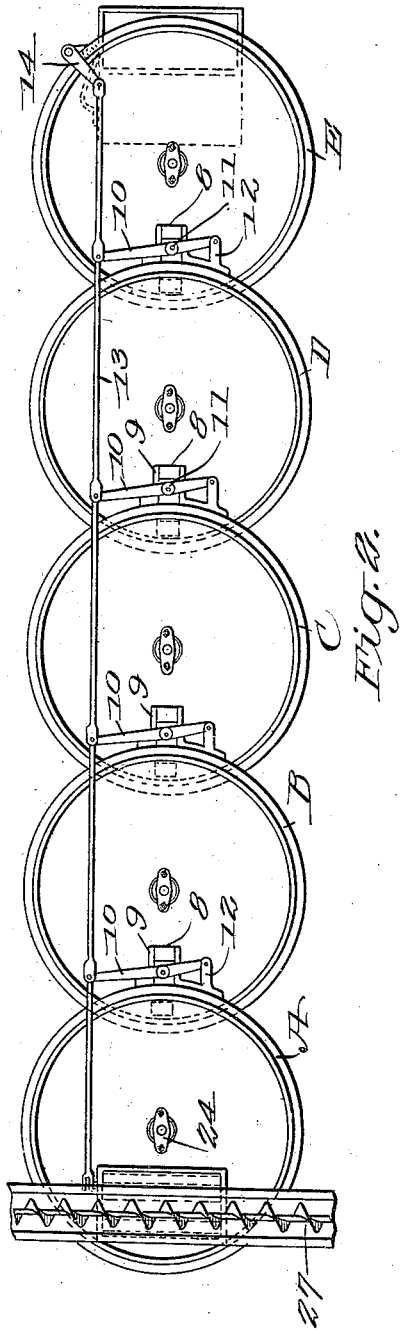
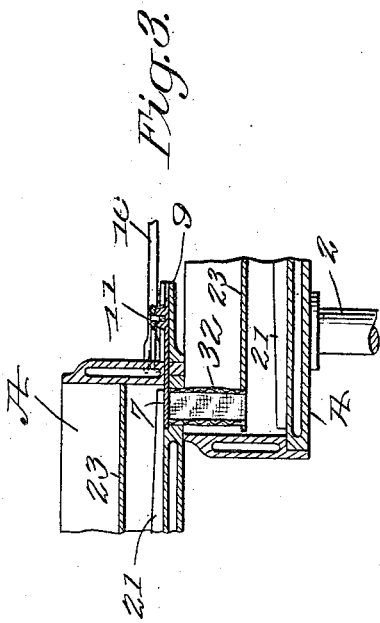
WITNESSES
Samuel E. Wade.
L. A. Stanley
INVENTOR
CHARLES H. FULSON
BY Munn & Co.
ATTORNEYS

UNITED STATES PATENT OFFICE.

CHARLES HIRAM FULSON, OF MEMPHIS, TENNESSEE, ASSIGNOR OF ONE-HALF TO JOHN WARNER TODD, OF NEW ORLEANS, LOUISIANA.

DEVICE FOR COOKING COTTON-SEED OR LINSEED MEATS.

1,041,455.  Specification of Letters Patent.  Patented Oct. 15, 1912.

Application filed November 22, 1911. Serial No. 661,653.

*To all whom it may concern:*

Be it known that I, CHARLES HIRAM FULSON, a citizen of the United States, and a resident of Memphis, in the county of Shelby and State of Tennessee, have invented a new and useful Device for Cooking Cotton-Seed or Linseed Meats, of which the following is a full, clear, and exact description.

My invention relates to improvements in devices for cooking cottonseed or linseed meats preparatory to pressing the oil therefrom, and it consists in the combinations, constructions and arrangements herein described and claimed.

An object of my invention is to provide a device having a series of retainers, each provided with a movable cover, which may be held in close contact with the charge to be cooked and which may be moved automatically by the pressure of the charge itself, or manually.

A further object of my invention is to provide means for transferring the charge from one receptacle to another while maintaining the moisture in the charge.

A further object of my invention is to increase the yield of oil without detracting from the quality of the product.

Other objects and advantages will appear in the following specification, and the novel features of the device will be particularly pointed out in the appended claims.

My invention is illustrated in the accompanying drawings forming part of this application, in which similar reference characters indicate like parts in the views, and in which,—

Figure 1 is a central vertical section through the device, certain parts being shown in elevation for the sake of clearness; Fig. 2 is a plan view; and Fig. 3 is a detail view showing the outlet from one receptacle to another.

In carrying out my invention I provide a series of receptacles such as those shown at A, B, C, D, and E, these receptacles being of a cylindrical shape and preferably steam jacketed as shown in the drawings. The receptacle A is mounted upon a support 1, the receptacle B being mounted on a similar support 2 and extending underneath the edge of the receptacle A. Similarly the receptacles C, D and E are mounted on the respective supports 3, 4 and 5, each succeeding receptacle being on a lower level. The receptacle A is provided with an outlet opening 6 which, as shown in Fig. 3, may be covered by a slidable gate 7. The latter is carried by a bracket 9 which is secured to the outside of the receptacle. A lever 10 is pivotally secured at 11 to the gate 8 and also to a portion 12 of the bracket, one end of the lever being connected to a link 13 which is secured to a rock arm 14 on a rock shaft 15. When the latter is rocked it will be apparent that the gate 8 will be moved so as to open and close the opening 6. Each of the receptacles B, C and D has a similar device.

Referring now to Fig. 1, it will be seen that I provide a common drive shaft 16 having a bevel gear 17 arranged to mesh with a gear 18 on a shaft 19 which runs through the bottom of receptacle A. Secured to the shaft 19 is a hub 20 having resisting arms 21 which serve as stirrers. The shaft 19 is also provided with a hub 22 which is loosely mounted on the shaft and to which is secured a top or cover 23. Secured to the upper part of the hub is a yoke 24 through which the upper end of the shaft 19 extends. A spiral spring 25 surrounds the shaft 19, bearing at one end upon the upper part of the yoke and at the lower end upon a collar 26.

The means for charging the first receptacle A comprises a screw conveyer 27 which discharges upon a feed member 28. The latter is rocked so as to discharge periodically, by means of the link 29 which is attached to a rock arm 30 on the rock shaft 15. The cover 23 has an opening, and a flexible conduit 31 extends from this opening to the feed member 28, this construction permitting the charging of the receptacle A while retaining the vapors of the charge within the receptacle. It will be noticed that similar flexible conduits 32 are provided which extend from the exit opening, such as that shown at 6, of one receptacle through the top or cover of the succeeding receptacle.

From the foregoing description of the various parts of the device the operation thereof may be readily understood. It is very desirable to retain the moisture in the cooking meat since this aids in increasing the yield of oil, but where additional moisture is made use of, by adding water other than that in the meat itself, the yield of oil is of a lower grade, and furthermore the product requires more drying out before charging the oil press. I have found that if the cover of the cooking vessel is placed close to the surface of the charge and means is used to retain the moisture of the charge, such moisture is sufficient to accomplish a good yield of oil without the necessity of resorting to an additional supply of water. The charge is carried by the conveyer 27 and delivered to the feeding device 28 which is operated by means of the rock shaft 15 to feed the charge continuously into the first receptacle A where it may be cooked. The purpose of the spring 25 is to counterbalance the cover 23 so that the latter may be moved toward and from the bottom of the receptacle. The rotating shaft 19 will carry around the stirrers 21 but the cover will not be rotated. The moisture cannot escape and since there is no space between the top and the charge the moisture contained in the meat is entirely sufficient for causing a subsequent large yield of oil. The movement of the rock shaft 15 causes the opening of the gate 7, and the subsequent periodical discharge of a portion of the contents of the receiver A into the receptacle B. Here the charge undergoes a further cooking, the top 23 remaining in close contact automatically. Thus the charge is passed from one receptacle to another until finally it is delivered to the feed member 33 below the last receptacle E from whence it may be conveyed to the oil press.

It will be apparent that the provision of the yielding tops will permit a greater or a less charge in any of the receptacles while the top is in contact with the charge. In the ordinary form of cooker having a hinged top, there is necessarily a space between the cover and the top of the charge into which the moisture of the meat escapes, thereby taking from the charge the very moisture which is essential to a large yield of oil. With my device this cannot occur. If it is desirable at any time to adjust the tension of the top or to manually raise the cover from the charge, it may be done by moving the collar 26 upwardly on the shaft 19. Thus the cover may be adjusted manually as well as automatically.

I claim:—

1. In a device for cooking cottonseed or linseed meats, a receptacle, a movable cover therefor, means for charging said receptacle, and means for stirring the charge, said cover being moved away from or toward the bottom of the receptacle by the respective charging or discharging of the receptacle.

2. In a device for cooking cottonseed or linseed meats, a series of receptacles, a movable cover for each receptacle, an outlet for each receptacle, a flexible conduit extending from the outlet of one receptacle through the cover in the adjacent receptacle, and spring means for suspending each of said covers in contact with the charge in the receptacle.

3. In a device for cooking cottonseed or linseed meats, a receptacle, a cover movable toward or away from the bottom of said receptacle, a stirring device within said receptacle, means for feeding a charge into the receptacle, an outlet from said receptacle, and means for preventing the escape of moisture from said receptacle.

4. In a device for cooking cottonseed and linseed meats, a receptacle, a cover therefor movable toward or away from the bottom of the receptacle, said cover being provided with an inlet opening near one edge thereof, the bottom of the receptacle being provided with an outlet opening on the opposite side of the receptacle from the inlet opening, a series of rotary stirring arms disposed within said receptacle, and a shaft for rotating said stirring arms, said shaft passing through the cover.

5. In a device for cooking cottonseed and linseed meats, a receptacle, a cover therefor movable toward or away from the bottom of the receptacle, said cover being provided with an inlet opening near one edge thereof, the bottom of the receptacle being provided with an outlet opening on the opposite side of the receptacle from the inlet opening, a series of rotary stirring arms disposed within said receptacle, a shaft for rotating said stirring arms, said shaft passing through the cover, a hub for said shaft connected to said cover, a yoke carried by the hub, an adjustable collar carried by the shaft, and a spring disposed about said shaft and bearing at one end on said yoke and at the other end on said collar.

CHARLES HIRAM FULSON.

Witnesses:
JOHN DALE,
D. D. HEIBERGH.

Copies of this patent may be obtained for five cents each, by addressing the "Commissioner of Patents, Washington, D. C."